(12) United States Patent
Thurlow

(10) Patent No.: US 11,933,272 B2
(45) Date of Patent: Mar. 19, 2024

(54) METHOD FOR STABILISING A ROTOR OF A WIND TURBINE

(71) Applicant: VESTAS WIND SYSTEMS A/S, Aarhus N (DK)

(72) Inventor: Anders Druedahl Thurlow, Silkeborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/294,660

(22) PCT Filed: Nov. 1, 2019

(86) PCT No.: PCT/DK2019/050329
§ 371 (c)(1),
(2) Date: May 17, 2021

(87) PCT Pub. No.: WO2020/098887
PCT Pub. Date: May 22, 2020

(65) Prior Publication Data
US 2022/0010773 A1    Jan. 13, 2022

(30) Foreign Application Priority Data
Nov. 16, 2018  (DK) .......................... PA 2018 70754

(51) Int. Cl.
*F03D 7/02*  (2006.01)
(52) U.S. Cl.
CPC .... *F03D 7/0284* (2013.01); *F05B 2270/1031* (2013.01); *F05B 2270/1075* (2013.01); *F05B 2270/337* (2013.01)

(58) Field of Classification Search
CPC ................ F03D 7/0284; F03D 7/0224; F05B 2270/1031; F05B 2270/1075;
(Continued)

(56) References Cited

U.S. PATENT DOCUMENTS

2009/0174187 A1  7/2009  Nyborg
2010/0119369 A1  5/2010  Risager et al.
(Continued)

FOREIGN PATENT DOCUMENTS

| EP | 2196666 A1 | 6/2010 |
| WO | 2016138647 A1 | 9/2016 |
| WO | 2020098887 A1 | 5/2020 |

OTHER PUBLICATIONS

PCT International Search Report for Application No. PCT/DK2019/050329 dated Dec. 19, 2019.
(Continued)

*Primary Examiner* — Joseph Ortega
(74) *Attorney, Agent, or Firm* — Patterson + Sheridan, LLP

(57) ABSTRACT

The present invention relates to a method for stabilizing a rotor of a wind turbine during a time period following an abnormal grid event, the method comprising the steps of detecting an occurrence of the abnormal grid event, reducing an allowable rotor thrust from a first thrust limit to a second thrust limit, detecting that the abnormal grid event has ended, and maintaining the second thrust limit a selected time period after the abnormal grid event has ended. The present invention further relates to a wind turbine controller and a computer program product for performing this method.

9 Claims, 2 Drawing Sheets

(58) Field of Classification Search
CPC .. F05B 2270/337; H02P 2101/15; H02P 9/06;
Y02E 10/72
See application file for complete search history.

(56) References Cited

U.S. PATENT DOCUMENTS

| | | |
|---|---|---|
| 2010/0140941 A1* | 6/2010 | Egedal .................... F03D 7/044 |
| | | 290/44 |
| 2015/0008673 A1 | 1/2015 | Damen |
| 2015/0333501 A1 | 11/2015 | Geisler et al. |
| 2016/0069326 A1 | 3/2016 | Menke |
| 2017/0241405 A1* | 8/2017 | Krüger .................... F03D 7/047 |
| 2018/0320663 A1* | 11/2018 | Kjær ..................... F03D 7/0224 |

OTHER PUBLICATIONS

PCT Written Opinion of the International Searching Authority for Application No. PCT/DK2019/050329 dated Dec. 19, 2019.
Danish Patent and Trademark Office 1st Technical Examination for Application No. PA 2018 70754 dated May 14, 2019.
European Patent Office, Communication pursuant to Article 94(3) EPC for Application 19 798 534.4-1202 dated Jun. 21, 2023.

* cited by examiner

METHOD FOR STABILISING A ROTOR OF A WIND TURBINE

FIELD OF INVENTION

The present invention relates to a method for stabilising a rotor of a wind turbine in connection with abnormal grid events. In particular, the present invention relates to a method for preventing, or at least reducing, rotor oscillations of wind turbines in connection with abnormal grid events.

BACKGROUND OF THE INVENTION

It is well-known that keeping wind power plants connected to power grids is important when a power grid is subjected to an abnormal grid event.

Many generator designs use electric current flowing through windings to produce the magnetic field on which the generator operates. Such generator may have a threshold voltage, below which threshold voltage the generator either does not work properly, or works at a reduced efficiency. Some generators will even disconnect themselves from the power grid, when the grid voltage is below this threshold. This effect is more pronounced in doubly-fed induction generators (DFIG), which have two sets of powered magnetic windings (one stationary and one rotating), than in squirrel-cage induction generators which have only one. Synchronous generators may slip and become unstable if the voltage of the stator winding decreases below a certain threshold.

Moreover, in situations with low grid voltage, the wind turbine rotor may experience oscillations, that may cause unwanted loads on both the generator and the tower. These loads may have serious impact on wind turbine operation. Thus, by alleviating these loads, the wind turbine operation can be stabilised. Moreover, wear and tear and thereby the overall life time of the wind turbine may be increased.

An abnormal grid event may involve a low voltage event (LVE), A Low Voltage Ride Through (LVRT) relates to the ability of a wind turbine to stay connected to the power grid throughout an LVE. During an LVRT the generator stay connected to the power grid in order to support the power grid with reactive power so as to support the grid voltage. When the grid voltage has recovered to a certain value, active power may be provided to the power grid in order to support the grid frequency.

Thus, when an LVE occurs it is of great importance that a wind turbine or a wind power plant stays connected to the power grid in order to prevent major blackouts. A blackout may be a short-term or a long-term loss of the electric power to a particular area in the power grid.

DESCRIPTION OF THE INVENTION

It may be seen as an object of embodiments of the present invention to provide a method and a control system that facilitates that wind turbines stay connected to a power grid during abnormal grid events.

It may be seen as a further object of embodiments of the present invention to provide a method and a control system for preventing, or at least reducing, rotor oscillations of wind turbines in connection with abnormal grid events.

In view of the above-mentioned objects there is provided, in a first aspect, a method for stabilizing a rotor of a wind turbine during a time period following an abnormal grid event, the method comprising the steps of detecting an occurrence of the abnormal grid event, reducing an allowable rotor thrust from a first thrust lit to a second thrust limit, detecting that the abnormal grid event has ended, and maintaining the second thrust limit a selected time period after the abnormal grid event has ended.

Thus, a method is provided for stabilizing a rotor of a wind turbine in connection with abnormal grid events, such as during a time period following an abnormal grid event, By stabilizing the rotor, rotor oscillations are reduced, or even prevented in connection with abnormal grid events. This is an advantage as such rotor oscillations may result in undesired loads on the wind turbine generator and the wind turbine tower.

An abnormal grid event generally relates to a pronounced change in the operating conditions of the grid. An abnormal grid event may thus involve a change in the grid voltage, such as an LVE. Short-circuits in the grid may potentially result in an LVE.

An LVE may be defined differently by the transmission system operators (TSO) worldwide and defined in so-called grid codes. The identification of a LVE may be performed depending on one or more of the following variables: change in a grid voltage, a fault message from a converter and a fault message from a generator. In an embodiment a voltage range can preferably be defined, with the result that, when a change in the grid voltage is outside the voltage range, an LVE is identified. The grid voltage may be measured directly at the grid, e.g. at the point of common coupling, however it may also be derived from measurements made at the wind turbine. In an embodiment, an LVE may for example arise when a grid voltage is equal to or below for example 90% of a rated grid voltage.

An occurrence of an abnormal grid event may be detected using various means, such as a voltage detector configured to measure a grid voltage. The grid voltage detected by the voltage detector may be provided to a controller for further processing in order to determine an occurrence of an abnormal grid event. The same voltage detector may also be used to detect that an abnormal grid event has ended. Alternatively or in combination therewith a current detector and/or a power detector may also be applied. The current detector and the power detector may also be used to detect that an abnormal grid event has ended.

In the present context a rotor thrust limit is to be understood as a maximum allowable rotor thrust. Thus, prior to an occurrence of an abnormal grid event the maximum allowable rotor thrust may be set to the first thrust limit. When an occurrence of the abnormal grid event is detected the maximum allowable rotor thrust is reduced from the first thrust limit to the second thrust limit in order to prevent, or at least reduce, rotor oscillations. In order to comply with the reduced maximum allowable rotor thrust a higher pitch angle is required, i.e. the rotor blades are pitched out of the wind. The higher pitch angle also leads to a lower rotor speed which further results in a lower power output from the wind turbine.

When an abnormal grid event has ended, the maximum allowable rotor thrust may be increased from the second thrust limit to a higher thrust limit, such as the first thrust limit, at the expiry of a selected time period. The duration of the selected time period may be predefined in a controller, and the selected time period may be administrated by means of a timer or a counter or any or other unit suitable for this purpose.

Alternatively, the allowable rotor thrust may be increased from the second thrust limit to intermediate allowable thrust limits, such as an intermediate allowable thrust limit between the first thrust limit and the second thrust limit. The second thrust limit may be at least 20%, such as 25%, such as 30%, such as 35%, such as 40% lower than the first thrust limit. The second thrust limit may alternatively depend on the severity of the abnormal grid event.

The selected time period may be given in seconds or any other units that may indicate a time period, such as a digit for use in a counter. The selected time period may be smaller than 20 s, such as smaller than 15 s, such as smaller than 10 s, such as smaller than 8 s, such as smaller than 5 s, such as around 3 s.

The rate of change of the allowable thrust limit may be predefined in a controller, and it may for example depend on the severity of the abnormal grid event. It may further depend on the ability of the components of the system to react within a short time frame, as well as the component's ability to withstand changes in system conditions within a short time frame. In general, it may be advantageous that the allowable rotor thrust is reduced from the first thrust limit to the second thrust limit within a short time frame in order to avoid rotor oscillations. After the abnormal grid event has ended the allowable rotor thrust may advantageous be increased from the second thrust limit to the first thrust limit, or the intermediate thrust limit, with a slower rate of change as the LVE has ended and the system now is moving towards steady-state.

In a second aspect the present invention relates to a control system for stabilizing a rotor of a wind turbine during a time period following an abnormal grid event, the control system comprising an arrangement for detecting an occurrence of the abnormal grid event, and for detecting that the abnormal grid event has ended, and a controller for reducing an allowable rotor thrust from a first thrust limit to a second thrust limit during at least part of the abnormal grid event, and for maintaining the second thrust limit a selected time period after the abnormal grid event has ended.

Thus, a control system is provided for stabilizing a rotor of a wind turbine in connection with abnormal grid events, such as during a time period following an abnormal grid event. The definitions applied in relation to stability and abnormal grid events in connection with the first aspect may likewise be applied in connection with this second aspect.

The controller of the control system may be adapted to allow that the rotor thrust is increased from the second thrust limit to a higher thrust limit, such as the first thrust limit, at the expiry of the selected time period. The duration of the selected time period may be as defined in relation to the first aspect.

Alternatively, the controller may be adapted to allow that the allowable rotor thrust may be increased from the second thrust limit to intermediate allowable thrust limits, such as an intermediate allowable thrust limit between the first thrust limit and the second thrust limit.

The relative levels of the first and second thrust levels may be as addressed in relation to the first aspect. Moreover, the selected time period as well as the rate of change of the allowable thrust limits may be as discussed previously.

In a third aspect the present invention relates to a computer program product for performing the method according to the first aspect when said computer program product is run on a microprocessor of a control system of a wind turbine. The microprocessor may alternatively be a microcontroller, a computer chip, an ASIC or a FPGA.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be described in further details with reference to the accompanying figures, in which.

Figure 1:
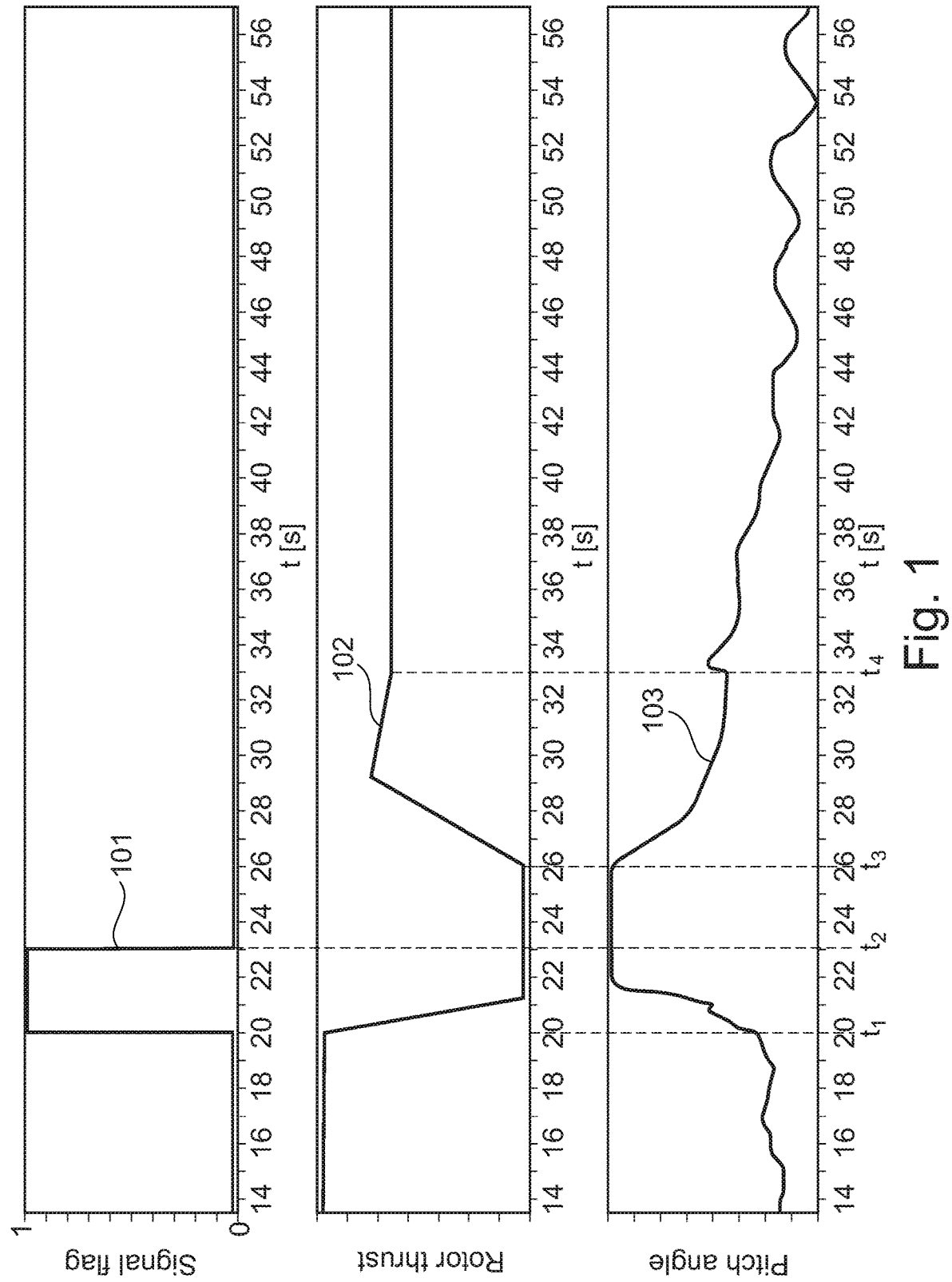
FIG. 1 illustrates a timing diagram showing a sequence of events in connection with an abnormal grid event is detected.

While the invention is susceptible to various modifications and alternative forms, specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

In general the present invention relates to a method for stabilising a rotor of a wind turbine in a time period following an abnormal grid event. As previously addressed the present invention provides a method and a control system that ensure that wind turbines remain connected to the power grid during abnormal grid events, and that rotor oscillations are prevented, or at least reduced, in connection with such abnormal grid events.

FIG. 1 illustrates examples of an allowable rotor thrust 102 and an associated blade pitch angle 103 as a function of time before, during and after an abnormal grid. As previously addressed an abnormal grid event typically involves a pronounced change in the operating conditions of the grid, such as for example an LVE.

As addressed above an LVE may be defined differently by the TSOs. Thus, an LVE may for example arise when a grid voltage is equal to or below for example 90% of the rated grid voltage. Other threshold values like for example 85%, 80% of the rated grid voltage may also be applicable.

In FIG. 1 the abnormal grid event starts at around t=20 s ($t_1$) and ends at around t=23 s ($t_2$). The allowable rotor thrust before, under and after the abnormal grid event is illustrated by curve 102. The allowable rotor thrust 102 may be a value setting a minimum or maximum limit on the allowable rotor thrust. Alternatively, the allowable rotor thrust 102 may be a set-point that the wind turbine is selected to work around.

When an abnormal grid event is detected at $t_1$, a signal flag is raised, cf. curve 101 in FIG. 1. This signal flag may be a binary "1" or a logic "true". At the same time, i.e. at $t_1$, the allowable rotor thrust 102 starts to decrease from a first thrust limit to a second thrust limit, resulting in an increase in the pitch angle 103 as the wind turbine, due to the reduced allowable rotor thrust, needs to pitch out of the wind. The first and second thrust limits are mutually related as previously discussed. Lowering the allowable rotor thrust 102 gives the rotor of the wind turbine some time to stabilise after the abnormal grid event has been detected.

When the abnormal grid event has ended at $t_2$, the controller of the wind turbine sends a signal flag indicating the end of the abnormal grid event. Such a signal flag may be a binary "0" or a logic "false".

The allowable rotor thrust 102 is maintained low, i.e. at the second thrust limit, for a selected time period after the abnormal grid event has ended at $t_2$. This is done using for example a timer or counter defining the selected time period before the allowable rotor thrust 102 may be increased to a higher allowable thrust limit, such as to the first thrust limit. It should be noted that the allowable rotor thrust 102 may alternatively be increased to intermediate allowable thrust limits, such as an intermediate allowable thrust limit between the first thrust limit and the second thrust limit.

The selected time period may be given in seconds or any other units that may indicate a time period, such as a digit for use in a counter. The selected time period may be smaller than 20 s, such as smaller than 15 s, such as smaller than 10 s, such as smaller than 8 s, such as smaller than 5 s, such as around 3 s as shown in FIG. 1, cf. curve 102.

As mentioned above, the allowable rotor thrust 102 is increased to a higher thrust limit after the selected time period has ended at $t_3$. This higher thrust limit may undergo a transient time period, but eventually it reaches a steady-state operating condition at $t_4$. At $t_3$ the pitch angle 103 also starts decreasing, which is a result of the higher allowable rotor thrust limit.

In FIG. 1 the allowable rotor thrust 102 reaches a steady-state operating condition after a time period of around 7 s. However, this steady-state period is not fixed and may thus depend on the severity of the abnormal grid event and the ability of the wind turbine controller to act properly when subjected to such an event.

Figure 2:
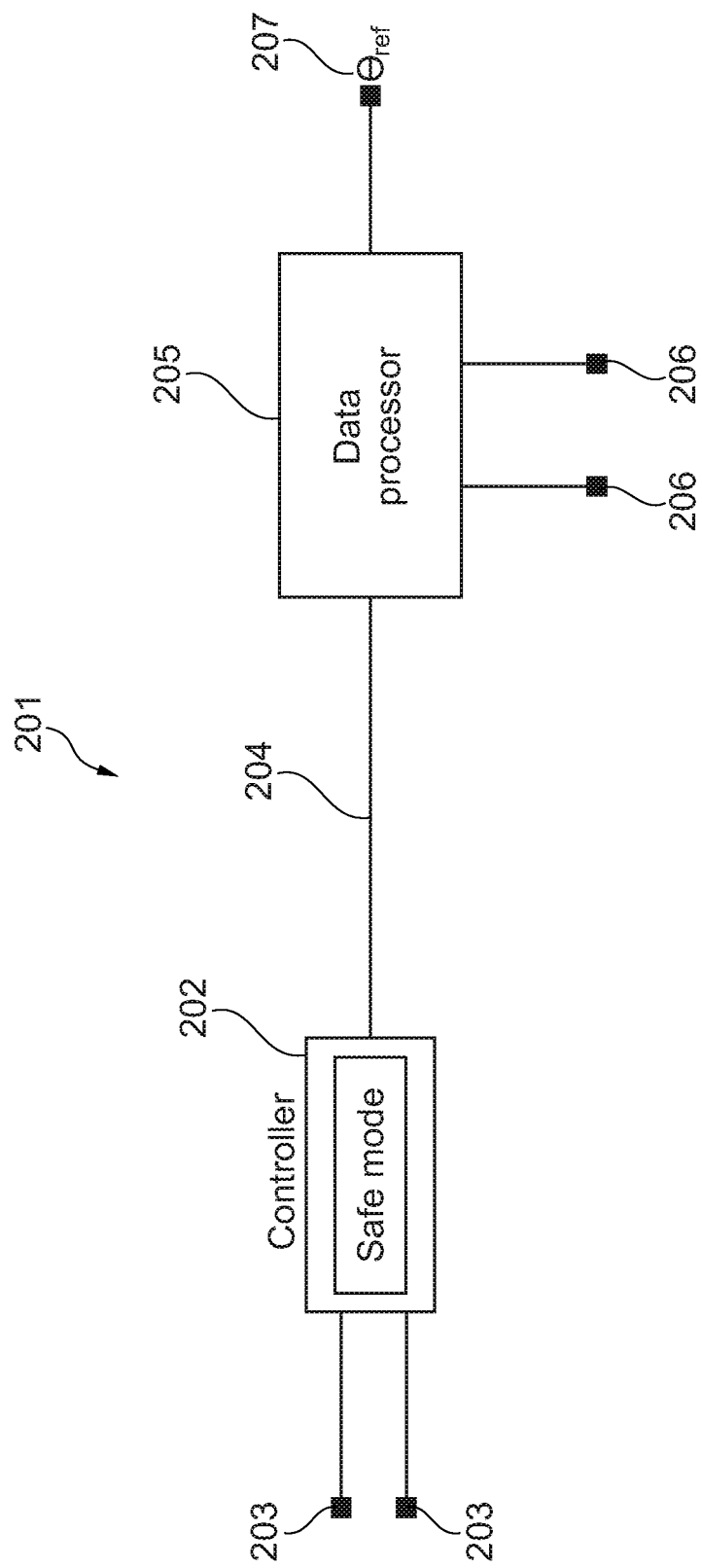
FIG. 2 illustrates a block diagram showing the control system together with other blocks forming part of the present invention.

FIG. 2 illustrates a block diagram of a part of the overall control system of a wind turbine. In general, the overall control system of the wind turbine is responsible for operating the wind turbine in response to various parameters.

The controller 202 of the control system 201 shown in FIG. 2 is configured to operate the wind turbine in accordance with a safe mode of operation. This safe mode implies that 1) a rotor thrust limit is calculated or selected in response to detecting an occurrence or an ending of an abnormal grid event, and
2) the calculated or selected rotor thrust limit is used to compute a pitch reference angle 207 for pitching the rotor blades of the wind turbine in order to stabilise the rotor of the wind turbine.

Thus, the controller 202 in a safe mode of operation prevents, or at least reduces, rotor oscillations of the wind turbine in connection with abnormal grid events. The controller 202 typically comprises a number of inputs 203. These inputs 203 may receive measurements and/or signals from measurement devices and/or other control systems. These measurements and/or signals may involve grid current, grid voltage, grid frequency and power.

The safe mode of the controller 202 provides an output thrust limit 204 that is processed in the data processor 205. The data processor 205 may optionally include other input signals 206 during its data processing. Again, these other input signals 206 may involve grid current, grid voltage, grid frequency and power.

As a result the output of the data processor 205 is a pitch angle reference 207 which is applied as a pitch setting of the rotor blades in order to comply with the rotor thrust limit computed by the by the controller 202.

The invention claimed is:

1. A method for stabilizing a rotor of a wind turbine, the method comprising:
    detecting, by a controller of a wind turbine, an occurrence of a low voltage event;
    setting, by the controller, a maximum allowable thrust of a rotor of the wind turbine in response to detecting the occurrence of the low voltage event;
    in response to detecting that the low voltage event ended, starting, by the controller, a timer;
    maintaining, by the controller, the set maximum allowable thrust of the rotor until the timer has expired; and
    increasing the set maximum allowable thrust of the rotor after the timer has expired.

2. The method of claim 1, wherein the timer runs for less than ten seconds before expiring.

3. The method of claim 1, wherein the set maximum allowable thrust when the timer is started is at least 20% lower than the set maximum allowable thrust after the set maximum allowable thrust is increased.

4. The method of claim 1, wherein setting the set maximum allowable thrust comprises reducing the set maximum allowable thrust with a predefined rate.

5. A control system for stabilizing a rotor of a wind turbine, the control system comprising:
    a voltage detector; and
    a controller for:
        detecting, based on the voltage detector, an occurrence of a low voltage event;
        setting a maximum allowable thrust of a rotor of a wind turbine during at least part of the low voltage event;
        detecting that the low voltage event ended;
        starting, in response to detecting that the low voltage event ended, a timer;
        maintaining the set maximum allowable thrust of the rotor until the timer has expired; and
        increasing the set maximum allowable thrust of the rotor after the timer has expired.

6. The control system according to claim 5, wherein setting the maximum allowable thrust comprises reducing the set maximum allowable thrust with a predefined rate.

7. A computer program product comprising a non-transitory computer readable medium storing instructions that, when executed by a microprocessor of a control system of a wind turbine, cause the microprocessor to perform an operation comprising:
    detecting an occurrence of a low voltage event;
    setting a maximum allowable thrust of a rotor of the wind turbine in response to detecting the occurrence of the low voltage event;
    in response to detecting that the low voltage event ended, starting a timer;
    maintaining the set maximum allowable thrust of the rotor until the timer has expired; and
    increasing the set maximum allowable thrust of the rotor after the timer has expired.

8. The computer program product of claim 7, wherein the set maximum allowable thrust when the timer is started is at least 20% lower than the set maximum allowable thrust after the set maximum allowable thrust is increased.

9. The computer program product of claim 7, wherein setting the set maximum allowable thrust comprises reducing the set maximum allowable thrust with a predefined rate.

* * * * *